US012760876B2

(12) United States Patent
Felt

(10) Patent No.: US 12,760,876 B2
(45) Date of Patent: Oct. 13, 2026

(54) ENCLOSED GUTTER CLIP AND EXPANDABLE BULB-HOLDING CLIP

(71) Applicant: Russel Williams Home Services LLC, Plymouth, MN (US)

(72) Inventor: David Russel Felt, Plymouth, MN (US)

(73) Assignee: Russel Williams Home Services LLC, Plymouth, MN (US)

( * ) Notice: Subject to any disclaimer, the term of this patent is extended or adjusted under 35 U.S.C. 154(b) by 0 days.

(21) Appl. No.: 19/072,112

(22) Filed: Mar. 6, 2025

(65) Prior Publication Data

US 2025/0243996 A1 Jul. 31, 2025

Related U.S. Application Data

(63) Continuation of application No. 18/588,335, filed on Feb. 27, 2024, now Pat. No. 12,366,347, which is a (Continued)

(51) Int. Cl.

*F21V 21/08* (2006.01)
*F21V 21/088* (2006.01)
*F21W 121/00* (2006.01)

(52) U.S. Cl.

CPC ..... *F21V 21/088* (2013.01); *F21W 2121/004* (2013.01)

(58) Field of Classification Search

CPC ... F16M 13/022; F21V 33/006; F21V 21/088; F21V 21/0885; E04D 13/064

(Continued)

(56) References Cited

U.S. PATENT DOCUMENTS 990,856 A * 5/1911 Freiberg ................. F16M 13/02 248/302
1,719,715 A * 7/1929 Monk ........................ F21S 4/28 362/382

(Continued)

FOREIGN PATENT DOCUMENTS

CN 204026567 U 12/2014
GB 240660 A 10/1925

OTHER PUBLICATIONS

Reexamination petition 90/019,874, filed Mar. 10, 2025 (Reexam of U.S. Pat. No. 10,711,985).

(Continued)

*Primary Examiner* — Muhammad Ijaz
(74) *Attorney, Agent, or Firm* — Greenberg Traurig, LLP

(57) ABSTRACT

A decorative removable lighting enclosed clip made for mounting a light to a support surface such as gutters, shingles or a building structure. The enclosed clip allows for an aesthetically pleasing display of lights with rapid and easy installation and removal of the lighting. This eliminates falling debris from broken clips or clips that fall off the lights during the removal process. A support tab is inserted between the side portions of the structure, at longitudinally spaced intervals along the strip, and are frictionally gripped and retained by the facing side portions of the gutter, shingle or structure. The clips have enclosed end portions which support the light elements of a decorative light string along structure. The enclosed clip is capable of mounting onto a wide variety of gutters, eaves and building structures. The spacing is adjustable and provides a plurality of discrete angular positions.

26 Claims, 11 Drawing Sheets

Related U.S. Application Data continuation of application No. 17/834,394, filed on Jun. 7, 2022, now Pat. No. 11,913,626, which is a continuation of application No. 16/928,247, filed on Jul. 14, 2020, now Pat. No. 11,353,199, which is a continuation of application No. 16/655,074, filed on Oct. 16, 2019, now Pat. No. 10,711,985, which is a continuation of application No. 16/404,640, filed on May 6, 2019, now Pat. No. 10,557,620, which is a continuation-in-part of application No. 15/067,119, filed on Mar. 10, 2016, now Pat. No. 10,281,084.

(60) Provisional application No. 62/131,305, filed on Mar. 11, 2015.

(58) Field of Classification Search
USPC ...... 248/200, 205.6, 229.16, 222.11, 222.12, 248/229.26, 316, 7, 300; 362/391, 396, 362/249.01, 249.04, 152
See application file for complete search history.

(56) References Cited

U.S. PATENT DOCUMENTS 1,895,656 A * 1/1933 Gadke .................. A47G 33/105 24/339
2,331,877 A * 10/1943 Sterling .................... F21S 4/10 362/396
2,494,881 A * 1/1950 Kost ........................ H05K 7/12 248/223.41
2,569,078 A 9/1951 Silver
2,703,359 A * 3/1955 Miller ....................... F21S 4/10 248/230.8
3,515,364 A * 6/1970 Spicer ....................... F21S 4/10 248/74.3
3,540,687 A * 11/1970 Cuva ..................... F21V 21/088 248/223.41
3,578,282 A * 5/1971 Olsen ........................ F21S 4/10 362/396
3,599,916 A * 8/1971 Szabo ....................... F21S 4/10 24/339
3,599,918 A * 8/1971 Patchett ................ F21V 21/088 362/396
3,861,632 A * 1/1975 Siilats ................. F21V 19/0005 248/224.7
4,121,798 A * 10/1978 Schumacher .......... B44D 3/123 24/336
4,631,783 A * 12/1986 Hayashi ............... F16M 13/022 24/30.5 S
4,901,212 A * 2/1990 Prickett ..................... F21S 4/10 362/145
4,905,131 A * 2/1990 Gary ......................... F21S 4/10 362/249.11
5,056,747 A * 10/1991 Kireta ....................... F21S 4/20 248/74.2
5,249,108 A * 9/1993 Gary ......................... F21S 4/10 248/314
D365,014 S * 12/1995 Fennessy ....................... D8/371
5,542,636 A * 8/1996 Mann ........................ F21S 4/10 362/396
5,566,058 A * 10/1996 Protz, Jr. ............... F21V 21/088 362/396
D376,535 S * 12/1996 Gary .............................. D8/395
5,581,956 A * 12/1996 Fennessy .............. F21V 21/088 362/396
5,607,230 A * 3/1997 Protz, Jr. ............... F21V 21/088 362/396
5,619,774 A * 4/1997 Perry ........................ A45F 5/02 24/336
5,632,552 A 5/1997 Wang
5,667,296 A 9/1997 Cheng
5,730,522 A * 3/1998 Wyke ...................... F21V 19/00 248/300
5,772,166 A * 6/1998 Adams .................... F21V 21/08 248/229.16
5,921,511 A * 7/1999 LaPointe ................. F21V 21/08 248/74.1
D414,291 S * 9/1999 Gary .............................. D8/395
5,975,476 A * 11/1999 Mancinelli ............. B60R 7/082 248/902
D427,510 S * 7/2000 Gary .............................. D8/367
6,338,460 B1 * 1/2002 Rumpel .................... F21S 4/10 362/396
6,340,238 B1 * 1/2002 Pan ....................... F21V 21/088 362/396
6,409,364 B1 * 6/2002 Lin ....................... F21V 21/088 362/396
6,477,751 B2 11/2002 Baumdicker
6,502,958 B1 * 1/2003 Chen ...................... H01R 33/09 362/396
6,536,727 B1 * 3/2003 Limber ................. F21V 21/088 248/229.16
6,572,062 B1 * 6/2003 Limber ................. F21V 21/088 248/229.16
6,604,837 B2 * 8/2003 Sandberg ............ F21V 21/0885 362/396
6,652,112 B1 * 11/2003 Lucarelli ................. F21V 21/08 362/396
6,663,069 B1 * 12/2003 Norberg .................. F21V 21/08 24/339
6,691,374 B2 * 2/2004 Coyne ....................... A45F 5/02 24/336
D530,598 S * 10/2006 Jackson ......................... D8/395
D531,018 S * 10/2006 Jackson ......................... D8/395
D537,330 S * 2/2007 Cox .............................. D8/395
D538,636 S * 3/2007 Jackson ......................... D8/395
7,188,977 B1 * 3/2007 Lough ....................... F21S 4/10 362/396
7,309,150 B2 * 12/2007 Vendrick ................... F21S 4/10 362/152
D562,675 S * 2/2008 Cox .............................. D8/395
D562,676 S * 2/2008 Cox .............................. D8/395
D564,347 S * 3/2008 Limber .......................... D8/395
D574,702 S 8/2008 Stephens
D600,542 S 9/2009 Zemel
D612,120 S 3/2010 Panfili
7,841,653 B2 * 11/2010 Sanchez ............... B60N 2/2845 24/3.12
D669,773 S 10/2012 Colasse
D671,826 S * 12/2012 Adams, IV .................... D8/395
8,333,353 B1 * 12/2012 Silverman .............. F16M 13/00 248/205.6
D675,510 S 2/2013 Gary
8,459,712 B2 * 6/2013 Thrasher ................. B25B 31/00 248/219.2
8,469,322 B1 * 6/2013 Oxley ..................... F21V 21/00 362/147
8,545,041 B2 * 10/2013 Brown ................ F21V 21/0885 24/336
D696,105 S * 12/2013 Devilliers ...................... D8/395
8,733,710 B1 * 5/2014 Suazo ...................... H02G 3/32 248/74.1
8,888,337 B2 * 11/2014 Adams, IV ............... F21S 4/10 362/396
D737,132 S 8/2015 Garcia
D741,161 S 10/2015 Buresh, II
9,255,724 B2 * 2/2016 Martínez Sanz ....... F24S 40/46
D756,764 S 5/2016 Limber
9,644,821 B2 * 5/2017 Zhang ..................... F21V 21/08
D799,314 S 10/2017 Adams, IV
D824,246 S * 7/2018 Ming ............................. D8/382
D835,316 S 12/2018 Edgar
10,180,242 B2 1/2019 Schreiber
D843,430 S 3/2019 Hodgson
10,281,084 B2 * 5/2019 Felt ........................... F16B 1/00
D853,818 S 7/2019 Bergman
D856,791 S * 8/2019 Limber .......................... D8/395
11,353,199 B2 * 6/2022 Felt ....................... F21V 21/088
11,674,672 B1 * 6/2023 Roper ....................... F16B 2/20 362/396

(56) References Cited

U.S. PATENT DOCUMENTS

| | | | | | |
|---|---|---|---|---|---|
| D1,040,393 | S * | 8/2024 | Song | D8/395 | |
| D1,081,348 | S * | 7/2025 | Merryman | D8/395 | |
| 2002/0186562 | A1 * | 12/2002 | Schroetter | F21V 21/088 | 362/396 |
| 2004/0129846 | A1 * | 7/2004 | Adams | F21V 21/088 | 248/301 |
| 2006/0152927 | A1 * | 7/2006 | Vendrick | F21S 4/10 | 362/249.01 |
| 2007/0223221 | A1 * | 9/2007 | George | F21V 21/096 | 362/396 |
| 2008/0135703 | A1 * | 6/2008 | Craig | A47B 96/061 | 248/229.16 |
| 2009/0010012 | A1 * | 1/2009 | George | F21V 21/096 | 362/427 |
| 2009/0133350 | A1 * | 5/2009 | Pritchard | F21V 21/088 | 52/520 |
| 2009/0268436 | A1 * | 10/2009 | Taiga | F21L 4/00 | 362/158 |
| 2010/0118554 | A1 * | 5/2010 | Kraus, Jr. | H02G 3/24 | 362/396 |
| 2011/0108686 | A1 * | 5/2011 | Lu | F16B 47/00 | 248/205.6 |
| 2011/0260025 | A1 * | 10/2011 | Aoshima | F16L 3/223 | 248/231.81 |
| 2012/0198680 | A1 * | 8/2012 | Durben | F21S 4/10 | 248/220.21 |
| 2012/0241575 | A1 * | 9/2012 | Martinez Sanz | F24S 10/40 | 248/316.7 |
| 2013/0014448 | A1 * | 1/2013 | Jones | A47G 7/045 | 52/749.1 |
| 2013/0294056 | A1 * | 11/2013 | Eibner | F21L 4/02 | 362/184 |
| 2013/0333197 | A1 * | 12/2013 | Schulte | B25J 1/04 | 29/525.08 |
| 2014/0309050 | A1 * | 10/2014 | Nell | H05B 45/20 | 473/207 |
| 2018/0245733 | A1 * | 8/2018 | Felt | F21V 21/088 | |
| 2019/0257502 | A1 * | 8/2019 | Felt | F21V 21/0885 | |
| 2022/0010946 | A1 * | 1/2022 | Chen | F21V 17/164 | |

OTHER PUBLICATIONS

Reexamination petition 90/019,875, filed Mar. 10, 2025 (Reexam of U.S. Pat. No. 11,353,199).

Reexamination petition 90/019,876, filed Mar. 10, 2025 (Reexam of U.S. Pat. No. 10,281,084).

All In One Clips—Holds C7, C9, Swag, Tube, Icicle and Mini Christmas Lights—100 Pack—1000Bulbs.com, https://web.archive.org/web/20130921004154/https://www.1000bulbs.com/product/86329/HLS-39032-100PK.html, Sep. 17, 2020, 3 pgs.

Brite Ideas decorating, Custom Designs Commercial & Residential, at http://holidaymagiclights.com/wpcontent/uploads/2014/10/Online-2014-Brite-Ideas-Catalog.pdf, 52 pgs.

C7 and C9 Accessories—All-In-One Clip, 100 Pack, https://web.archive.org/web/20140126132146/https://www.christmaslightsetc.com/p/All-In-One-Christmas-Light-Clip-100-Pack--17620.htm, Sep. 17, 2020, 1 pg.

https://www.christmaslightsetc.com/p/All-In-One-Christmas-Light-Clip-100-Pack-17620.html ChristmaslightsEtc.com—(Year:2014), 2 pp.

Multipurpose Accessories—All-In-One Clip, 1000 Pack, https://web.archiveorg/web/20080919151444/ http://www.christmaslightsetc.com/p/All-In-One-Christmas-Light-Clip-1000-Pack--13739.htm, retrieved Sep. 17, 2020, 3 pgs.

Seasonal Lighting & Holiday Decorative 2014, American Lighting, Bright Ideas—Innovative Products, 29 pgs.

Defendant Minleon's Disclosure of Invalidity and Noninfringement, received Jan. 21, 2025 from *Russel Williams Home Services LLC* v *Minleon International* (*USA*) *Limited LLC and Minleon Group Ltd*, 251 pp. (Uploaded in six parts).

Order Granting Request for Ex Parte Reexamination of U.S. Appl. No. 90/019,874, dated Apr. 16, 2025.

Order Granting Request for Ex Parte Reexamination of U.S. Appl. No. 90/019,875, dated Apr. 16, 2025.

Order Granting Request for Ex Parte Reexamination of U.S. Appl. No. 90/019,876, dated Apr. 15, 2025, 18 pp.

Reexamination petition 90/019,969, filed May 22, 2025 (Reexam of U.S. Pat. No. 11,913,626).

Signed statement of Travis Freeman, President of Brite Ideas Decorating, Inc.

Non-final Office Action from Reexamination application No. 90/019,875, dated Aug. 12, 2025, 13 pp.

Non-final Office Action from Reexamination application No. 90/019,876, dated Aug. 20, 2025, 15 pp.

Request for Ex Parte Reexamination of U.S. Pat. No. 12,366,347, filed Aug. 12, 2025, 108 pp.

Brite Ideas Signed Statement by President (Year: 2025).

C7/C9 Tuff Christmas Light Clip, found at https://www.youtube.com/watch?v=sK7ofRerODI.

Declaration of David Felt under 37 CFR § 1.132, dated Sep. 9, 2025.

Email from Dean Stiteler to Chase Means, dated Sep. 12, 2021.

Email of Aug. 13, 2024, from Augie Roper to Justin Monk.

Email of Jul. 24, 2021, from Dean Stiteler to Chase Means.

Final Office Action from Reexamination application No. 90/019,874, dated Nov. 19, 2025, 11 pp.

Letter to Dean Stiteler from Chase Means (including exhibits) re Unauthorized Use and Sale of Patented Gutter Clips, dated Dec. 29, 2020.

Minleon Tuff Christmas Light Clip, found at https://www.youtube.com/watch?v=fxrQI-VV0ug.

Non-final Office Action from Reexamination application No. 90/019,874, dated Jul. 10, 2025, 15 pp.

Non-final Office Action from Reexamination application No. 90/019,969, dated Sep. 12, 2025, 18 pp.

NoveltyLights.com, Decorate Like a Pro: Why Tuff Clips are the pros Go-To Choice for Decorating, found at https://noveltylights.com/decorate-like-a-pro-why-tuff-clips-are-the-pros-go-to-choice-for-decorating?srsltid=AfmBOorV8p6nqjhNaYvFVzc86KLL_1ZI6JSqumGv9BbAkTDW45OhBxo-.

Office Action from Canadian application No. 3,080,527, dated Oct. 22, 2025, 4 pp.

Order Granting Request for Ex Parte Reexamination of U.S. Appl. No. 90/019,969, dated Jun. 9, 2025, 13 pp.

Pro Christmas C9 Tuff Clips—Bag of 100—Professional Grade Outdoor Hangers for Mounting C9 Light Lines on Gutters & Roof Shingles, found at https://www.amazon.com/Pro-Christmas-Tuff-Clips-Professional/dp/B0CJWW8T48?th=1.

Tuff Clips Take Down video and transcript from Jan. 30, 2019 available at https://www.youtube.com/watch?v=azMsMQSZyjl and https://www.tuffclips.com/informational-tuff-clips-videos/.

Order Granting Request for Ex Parte Reexamination of U.S. Appl. No. 90/015,445, dated Aug. 29, 2025, 15 pp.

Non-final Office Action from U.S. Appl. No. 90/015,445, dated Apr. 10, 2026, 13 pp.

* cited by examiner

ENCLOSED GUTTER CLIP AND EXPANDABLE BULB-HOLDING CLIP

CROSS-REFERENCE TO RELATED APPLICATIONS

This application is a continuation of U.S. patent application Ser. No. 18/588,335, filed Feb. 27, 2024, which is a continuation of U.S. patent application Ser. No. 17/834,394, filed Jun. 7, 2022 and issued on Feb. 27, 2024 as U.S. Pat. No. 11,913,626, which is a continuation of U.S. patent application Ser. No. 16/928,247, filed Jul. 14, 2020 and issued on Jun. 7, 2022 as U.S. Pat. No. 11,353,199, which is a continuation of U.S. patent application Ser. No. 16/655,074, filed Oct. 16, 2019 and issued on Jul. 14, 2020 as U.S. Pat. No. 10,711,985, which is a continuation of U.S. patent application Ser. No. 16/404,640, filed May 6, 2019 and issued on Feb. 11, 2020 as U.S. Pat. No. 10,557,620, which is a continuation-in-part of U.S. patent application Ser. No. 15/067,119, which was filed on Mar. 10, 2016 and issued on May 7, 2019 as U.S. Pat. No. 10,281,084, which claims priority to and the benefit of U.S. Provisional Patent Application No. 62/131,305, filed Mar. 11, 2015, the entireties of which are each incorporated herein by reference.

FIELD OF THE DISCLOSURE

The present disclosure generally relates to clips and fasteners for maintaining decorations, such as holiday lights, on gutters, shingles, or other structures. Specifically, the present disclosure relates to clips and fasteners capable of being mated to a bulb or other decoration.

BACKGROUND

The present disclosure generally relates to attaching linear systems, decorative holiday lighting displays, ornamental light strings, misting systems, or the like to surfaces, such as gutters and other structural surfaces. Embodiments disclosed herein may be used for attaching strands of lights and the like on the exterior of homes, buildings or other structures using an enclosed gutter clip. Depending on the particular clip design, a bulb may be positioned at different angles with respect to a roofline, gutter or other support surface. Gutter clips are typically designed to accommodate a bulb of a particular size and shape (e.g., C7, C9, mini bulbs, and/or other bulb sizes).

BRIEF DESCRIPTION OF THE DRAWINGS

To assist in understanding the disclosure, and to show how embodiments of the present application may be implemented, there will now be described by way of example specific embodiments, apparatuses, systems, and methods with reference to the accompanying drawings, in which.

DETAILED DESCRIPTION

Figure 1:
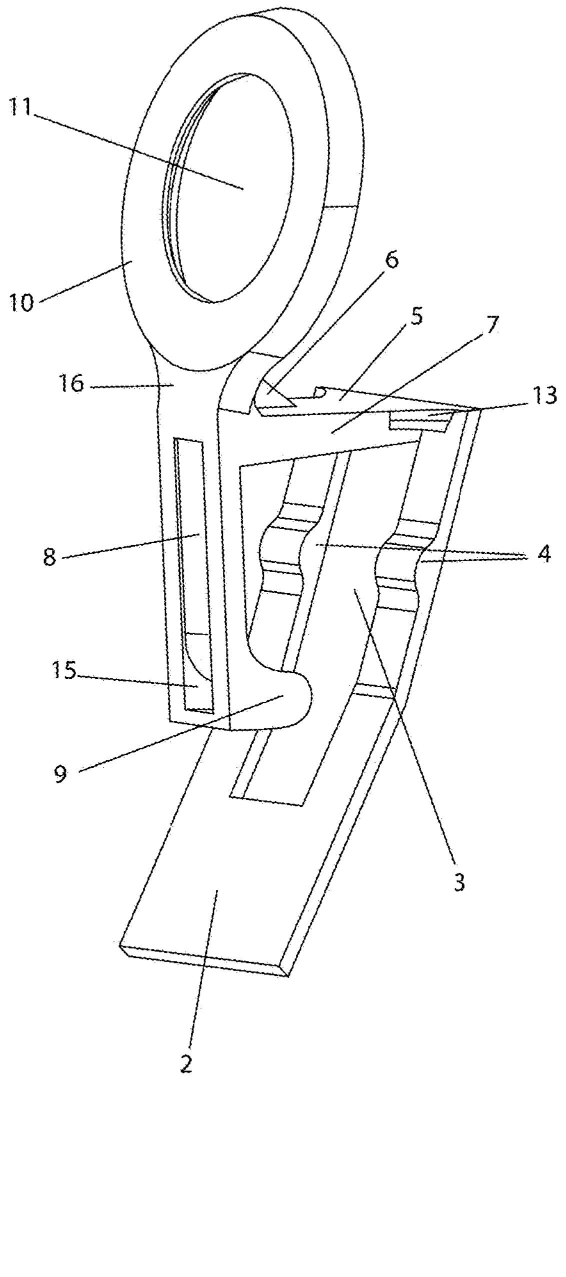
FIG. 1 is a front perspective view of an example gutter clip, according to an embodiment of the present application.

It has become increasingly popular to decorate the outside of buildings, homes and other structures with lights. These lights are generally arranged as a string of lights along a powered cord. Each individual light may be attached to a clip according to the present disclosure, which itself is adapted to mount to a gutter, shingle, or other structure. The clips of the present application may be designed to maintain a bulb at a particular angle and/or orientation, so as to provide a pleasing appearance. Lights are typically installed at a height that requires a ladder or lift. Installing the lights onto the gutters is very time consuming because the installer must move a ladder or lift as they install the lights across a building or structure.

A bulb is inserted thru the front of our enclosed gutter clip and screwed into the power socket from behind. It is then attached to the gutter without the use of staples, nails or any other type of fastener on the exteriors of homes, buildings or other structures while permitting bulbs to be angularly oriented with respect to the roofline at predetermined intervals at selected annular positions.

The enclosed gutter clip allows quick and efficient removal of the lights and clips simultaneously without causing any damage to the gutter line, roofline, structure or lights. By using an enclosed gutter clip you are able to remove the light strand in most instances without the use of a ladder or lift avoiding leaving behind broken gutter clips in the gutters themselves, on the roofline or on the ground.

The invention consists of certain novel features and a combination of parts hereinafter fully described, illustrated in the accompanying drawings and particularly pointed out in the appended claims, it being understood that various changes in the details may be made without departing from the spirit, or sacrificing any of the advantages of the present invention.

In an aspect of the present application, a clip includes an elongated body, a strut, a cantilever, a substantially circular bulb holder, and a neck. The elongated body has a first end and a second end. The strut has a first end and a second end, with the first end of the strut being rigidly connected to the second end of the elongated body. The first end of the strut and the second end of the strut collectively define a strut axis. The cantilever has a first end and a second end, with the first end of the cantilever being rigidly connected to the second end of the strut. The substantially circular bulb holder rigidly connects to and extends from the first end of the cantilever in a direction substantially opposite the second end of the cantilever. The bulb holder includes a hole configured to receive at least a portion of a bulb. The hole has a central axis extending therethrough that is substantially parallel to the strut axis. The neck is situated between and rigidly connects the cantilever and the bulb holder. The second end of the cantilever is resiliently capable of being pulled away from the elongated body to accommodate the positioning of a structure between elongated body and the cantilever. The clip is may be made from a substantially resilient material having a memory that causes the second end of the cantilever to return toward a relaxed position when not subject to an external force. When the structure is situated between the elongated body and the cantilever, the memory causes the second end of the cantilever to return toward the relaxed position, such that the cantilever and the elongated body exert pressure on the structure, to thereby maintain the position of the clip about the structure.

Decorative lighting clips, such as gutter or shingle clips, are often sold as aftermarket products separately from strands of lights. An installer may then mate the clips with the strand at desired intervals, and then attach the clips to a gutter, shingle, or other structure. The process of joining clips to a light strand can be tedious and time-consuming. For instance, joining existing clips to strands with larger bulbs, such as C7 or C9 bulbs, typically involves removing each bulb from its socket, positioning the clip in between the socket and the bulb, and screwing the bulb into place. Depending on the number of decorative lights being installed, this process can take a substantial amount of time. Moreover, for installers that provide home decoration services, the typical clip installation process may limit the number of homes that can be decorated over some period of time.

The present disclosure includes the realization that some decorative lighting bulbs (e.g., C7 and C9 bulbs, among other types of bulbs) have an asymmetric ellipsoidal shape (e.g., an ovoid or egg-like shape). Moving from the "front" end of such bulbs toward the "rear" end (the end having a metallic screw threading that engages with a socket), the diameter of the bulbs gradually increases until a maximum diameter portion is reached. Then, from the maximum-diameter portion to the rear end of the bulb, the diameter decreases more drastically, leading to an asymmetric shape. Embodiments of the present disclosure leverage this bulb asymmetry in order to provide a clip capable of widening to accommodate passage of a bulb in one direction (e.g., pushing the front end of the bulb through the rear of the clip), but resists passage of the bulb in the reverse direction (e.g., pulling the back end of the bulb through the front of the clip). As a result, clips of the present application may be installed with relative ease by pushing the clips over the front of the bulbs, without having to unscrew the bulbs from their sockets. In addition, due in part to the asymmetric shape of the bulbs, the clips may be difficult to pull off the bulbs once installed, enabling more efficient removal of lighting strands from their attached structure (e.g., by pulling the entire strand, rather than carefully removing each clip individually).

An example clip of the present disclosure includes a substantially circular bulb holder, which has a resting diameter that is smaller than the maximum diameter of a bulb. The clip may be made of any type of suitable plastic that is substantially rigid, but able to flex or deform to a limited degree. The clip includes a slot extending from the bulb holder, which enables the bulb holder to expand, such that its diameter can increase beyond its resting diameter. The clip, when pressed against a bulb having a maximum diameter that is larger than the resting diameter of the bulb holder, may expand or otherwise deform as the bulb passes through the bulb holder. The slot may extend along portions of the clip, such that a substantial portion of the clip is capable of flexing outwardly.

In addition to the example described above, other designs or structures may be used to impart a similar functionality onto the clips. For example, a bulb holder may include one or more cutouts that similarly enables the bulb holder to flex or otherwise accommodate passage of an object therethrough that is larger than its resting diameter. Additionally, the size and shape of the slot may vary, depending on the particular material used to construct the clip, a desired amount of flexibility, and/or other factors. Regardless of the particular implementation, one of ordinary skill would appreciate that various aspects of the clips described herein may be modified to suit a variety of purposes, while still providing a clip that is capable of being installed without the need to unscrew bulbs from their sockets.

In a first aspect of the present application, a clip includes an elongated body, a strut, a cantilever, a substantially circular bulb holder, and a slot. The elongated body has a first end and a second end. The strut has a first end and a second end. The first end of the strut is rigidly connected to the second end of the elongated body. The cantilever has a first end and a second end. The first end of the cantilever is rigidly connected to the second end of the strut. The substantially circular bulb holder is rigidly connected to and extends from the first end of the cantilever in a direction substantially opposite the second end of the cantilever. The bulb holder includes a hole having a first diameter that is configured to receive at least a portion of a bulb. The slot extends from the hole of the bulb holder and toward the second end of the cantilever. The slot and the hole of the bulb holder form a continuous space to enable the hole to temporarily deform and permit passage of the at least a portion of a bulb, with the bulb having a second diameter that is larger than the first diameter of the hole. The second end of the cantilever is resiliently capable of being pulled away from the elongated body to accommodate the positioning of a structure between the elongated body and the cantilever. The clip is made from a substantially resilient material having a memory that causes the second end of the cantilever to return toward a relaxed position when not subject to an external force. When the structure is situated between the elongated body and the cantilever, the memory causes the second end of the cantilever to return toward the relaxed position, such that the cantilever and the elongated body exert pressure on the structure, to thereby maintain the position of the clip about the structure.

In a second aspect of the present application, a clip includes a gripping section, a substantially circular bulb holder, and a cutout. The gripping section includes at least a body and a cantilever rigidly coupled to the body, with the cantilever being resiliently capable of being pulled away from the elongated body to accommodate the positioning of a structure between the body and the cantilever. The gripping section is made from a substantially resilient material having a memory that causes the cantilever to return toward a relaxed position when not subject to a force. The substantially circular bulb holder is rigidly connected to and extends from the gripping portion. The bulb holder includes a hole having a first diameter and is adapted to receive at least a portion of a bulb. The cutout extends from the hole and through at least a portion of the gripping section, and enables the hole to expand and permit passage of a bulb having a second diameter that is larger than the first diameter.

In a third aspect of the present application, a clip for mounting decorative light bulbs includes a first gripping section, a second gripping section, and a bulb holder. The first gripping section includes a first body section and a second cantilever section. The second gripping section includes a second body section and a second cantilever section. The bulb holder is coupled to the first gripping section and the second gripping section, and includes a hole having a resting diameter. The clip is formed from a substantially resilient material capable of temporary deformation. The first gripping section and the second gripping section are adapted to expand away from each other to, in turn, cause the hole of the bulb holder to expand, such that the bulb holder is adapted to permit passage of an object therethrough having a diameter that is larger than the resting diameter of the hole of the bulb holder.

The foregoing is illustrative only and is not intended to be in any way limiting. In addition to the illustrative aspects, embodiments, and features described above, further aspects, embodiments and features will become apparent by reference to the drawing figures, the following detailed description, and the claims.

There will now be described, by way of example, several embodiments of the present application as contemplated by the inventor. In the following description, specific details are set forth in order to provide a thorough understanding of the embodiments. It will be apparent, however, that the embodiments of the present disclosure may be practiced without limitation to these specific details. The specific embodiments disclosed herein are not intended to limit the scope of the present application.

The present invention shown in FIG. 1 is an enclosed gutter clip 1 having a hollowed rectangular shaped body 2. The body 2 may also be referred to as an elongated base. This body 2 has a slight protrusion 4 that secures body 2 on the structure, providing counter pressure on the body 2 portion side of the clip 1, and opposing pressure on strut 7, cantilever 8, and lobe 9. The protrusions 4 are not required but are useful in providing stability for the function of the clip 1; they provide extra structure to ensure the clip 1 is secure at a 90° angle. Bracket 5 and strut 7 connect to cantilever 8 perpendicularly, forming a 90° angle between cantilever 8, side 5, strut 7 and a 75° angle between body 2 and strut 7, bracket 5. The bracket 5 and/or the strut 7 may also be referred to as a support arm. The cantilever 8 may also be referred to as a cantilever beam. The clip 1 as shown in FIG. 1 is how the clip will generally (but not always) be positioned vertically on the outer edge of a structure. Cantilever 8 is on the outside of a structure or the top of a shingle and body 2 provides pressure on the opposite side of the gutter edge or shingle.

Figure 2:
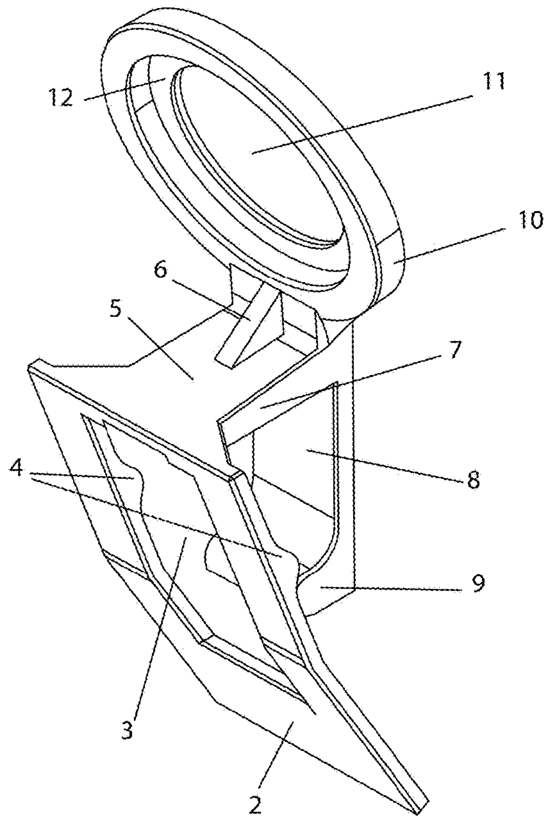
FIG. 2 is a rear perspective view of the example gutter clip, according to an embodiment of the present application.

The clip 1 is designed so that the protrusion 4 and cantilever 8 provide pressure on opposite sides of the gutter with the weight of the clip resting on top of the gutter edge on bracket 5. The body 2 below protrusion 4 provides extra pressure and stability for the clip 1. The bulb will be inserted through hole 11 on the front part of the outer flange 10 and screwed into the light socket that will be on the back side of the clip and within the socket guide ridge 12 (see FIG. 2). Outer flange 10 is supported by neck gusset 6 so that it is ridged and does not flex or move. Strut gusset 13 is to provide stability to the body 2 as it provides pressure against the surface opposition of cantilever 8. Socket guide ridge 12 could increase in thickness if preferred. The body 2 is designed to be longer than strut 7 for quicker installation on gutters, eaves or other structures. This area can be lengthened or shortened to accommodate size variances if needed. The neck 16 can be adjusted with neck gusset 6 if desired.

Hole 3 and opening 15 are unessential to the performance or functionality of the invention and are solely used for efficiency in the production of the clip. Opening 15 is to thin out cantilever 8 for the purpose of using less plastic and also to prevent clotting of the plastic as it flows through the dye tool. Strut 7 is indented on the bottom side of bracket 5 to reduce plastic and also to prevent clotting as the plastic flows through the dye tool. Hole 3 reduces plastic needed to create the clip and also allows the dye tool to move through hole 3 to create cantilever 8 with ease.

In order to place the clip 1 on the gutter, eaves or other structure, position the clip below the structure and push upward causing the ends to flex apart. Another way of attaching the clip 1 is to tilt the clip shown in FIG. 2 at an angle such that body 2 engages the structure and apply pressure.

One advantage of the present clip is that the clip 1 can flex to some extent to accommodate the gutter, eaves or structure. The present preferred clip has a standard distance 14 (see FIG. 4) of approximately ⅛ inch between body 2 and lobe 9 when clip 1 is attached to a gutter, eaves or other structure and is in a relaxed condition. The opposing ends of clip 1, i.e., body 2, cantilever 8 and lobe 9, can be pulled apart such that the distance 14 would be as much as 2 inches to accommodate the width of the gutter, eaves or shingles. Thus, the present clip can be fitted over structures from approximately ⅛ inch to 2 inches. When placed on a gutter, eaves, shingles or other structure, the protrusions 4 provide optional support in holding clip 1 in place.

The present clip is designed primarily for use on the eaves, gutters or shingles of a house; but, its use is not so limited.

Although I have described and illustrated certain present preferred embodiments of my clip it should be distinctly understood that the invention is not limited thereto, but may be variously embodied within the scope of the following claims.

Figure 3:
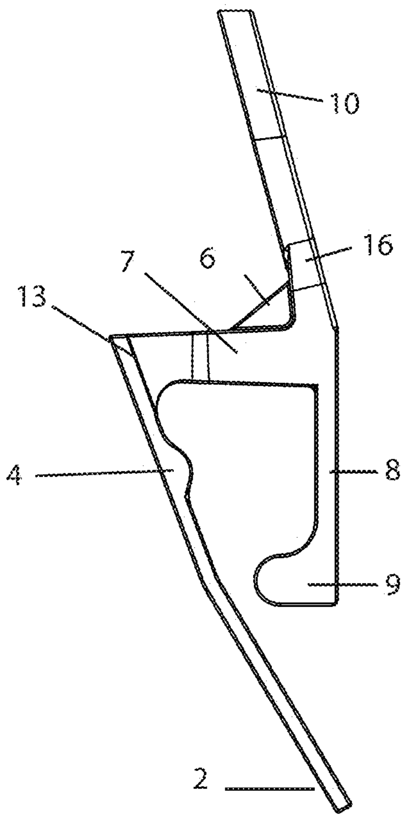
FIG. 3 is a side elevated view of the example gutter clip, according to an embodiment of the present application.
Figure 4:
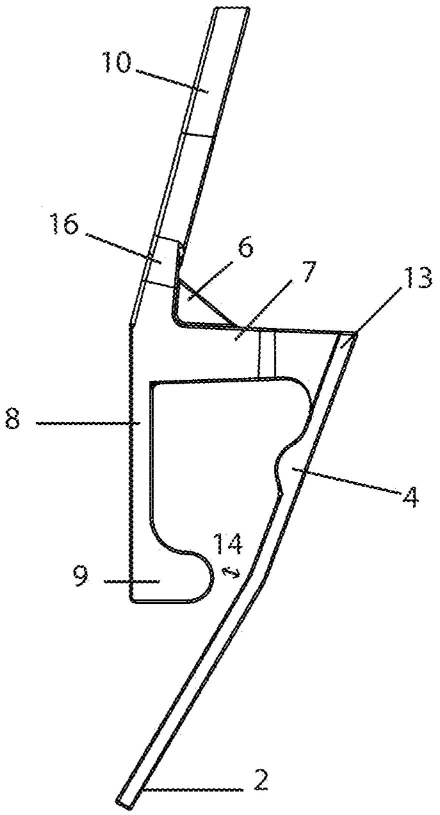
FIG. 4 is a side elevated view of the example gutter clip, according to an embodiment of the present application.
Figure 5:
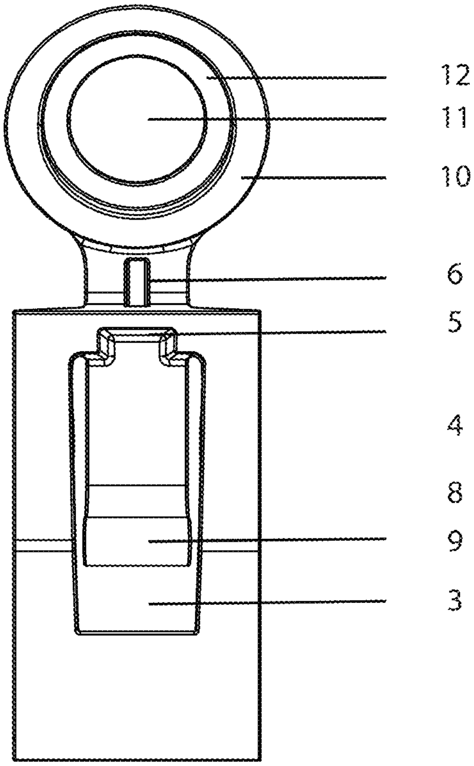
FIG. 5 is a rear elevated view of the example gutter clip, according to an embodiment of the present application.
Figure 6:
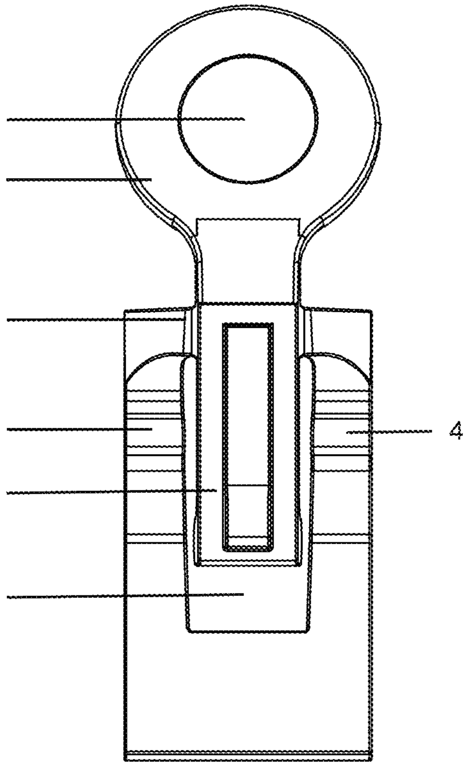
FIG. 6 is a front elevated view of the example gutter clip, according to an embodiment of the present application.
Figure 7:
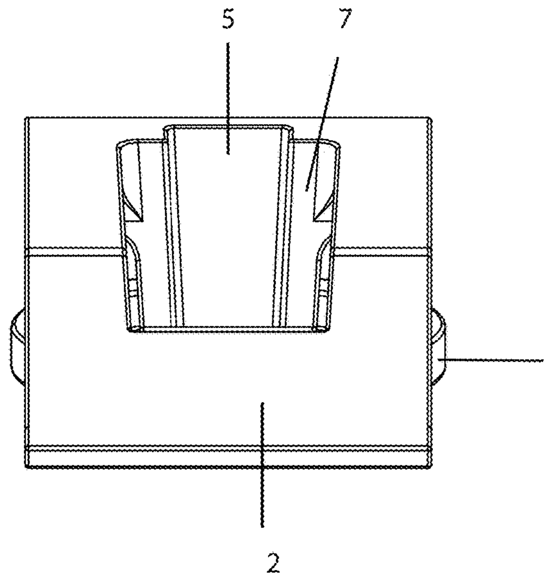
FIG. 7 is a bottom plan view of the example gutter clip, according to an embodiment of the present application.
Figure 8:
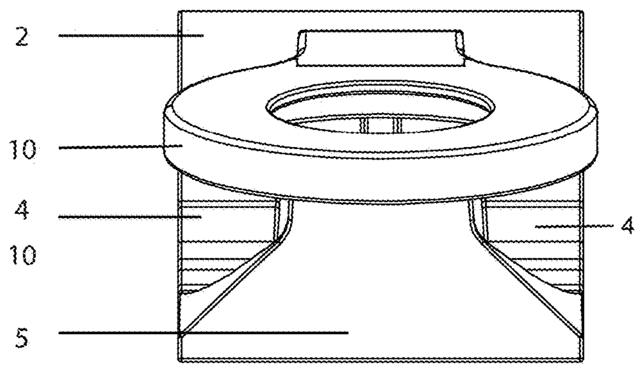
FIG. 8 is a top plan view of the example gutter clip, according to an embodiment of the present application.
Figure 9:
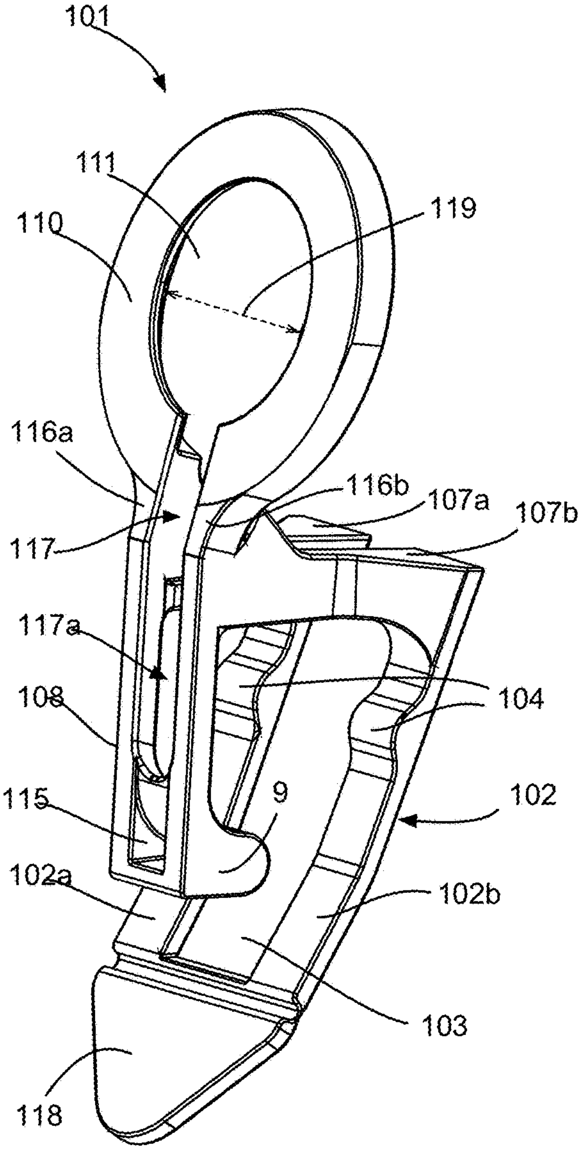
FIG. 9 is a front perspective view of an example gutter clip, according to an embodiment of the present application.
Figure 10:
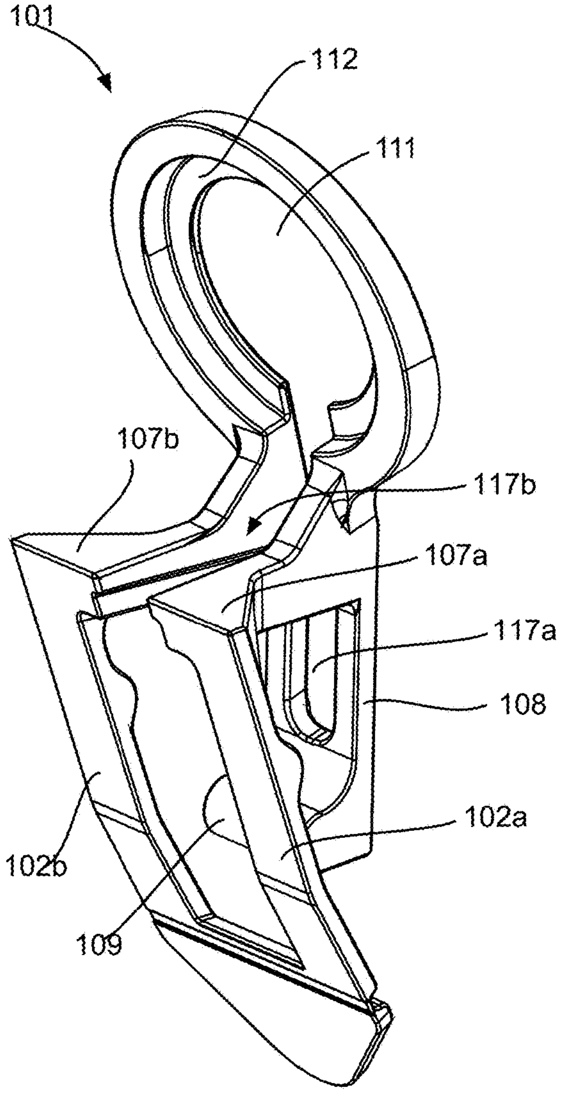
FIG. 10 is a rear perspective view of the example gutter clip, according to an embodiment of the present application.
Figure 11:
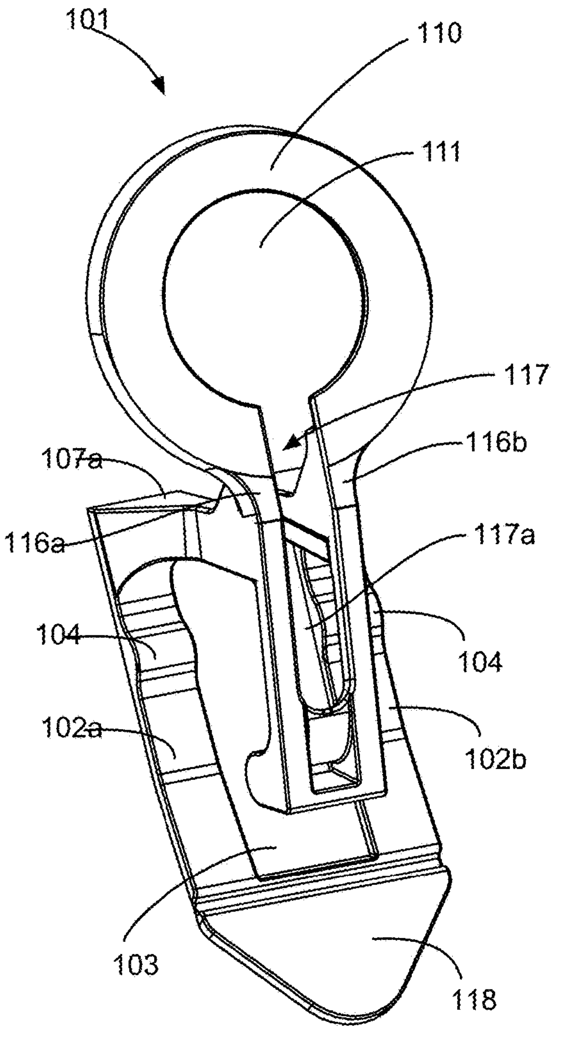
FIG. 11 is a front perspective view of the example gutter clip, according to an embodiment of the present application.
Figure 12:
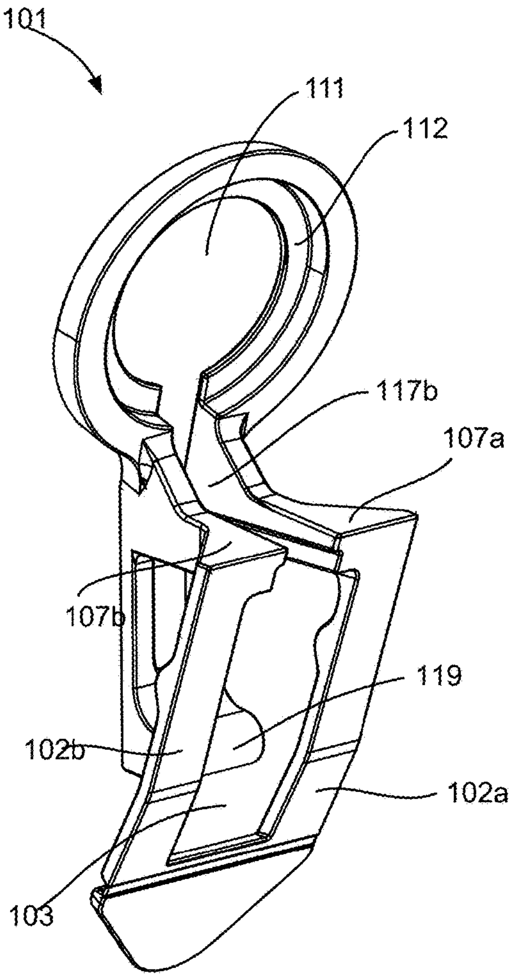
FIG. 12 is a rear perspective view of the example gutter clip, according to an embodiment of the present application.
Figure 13:
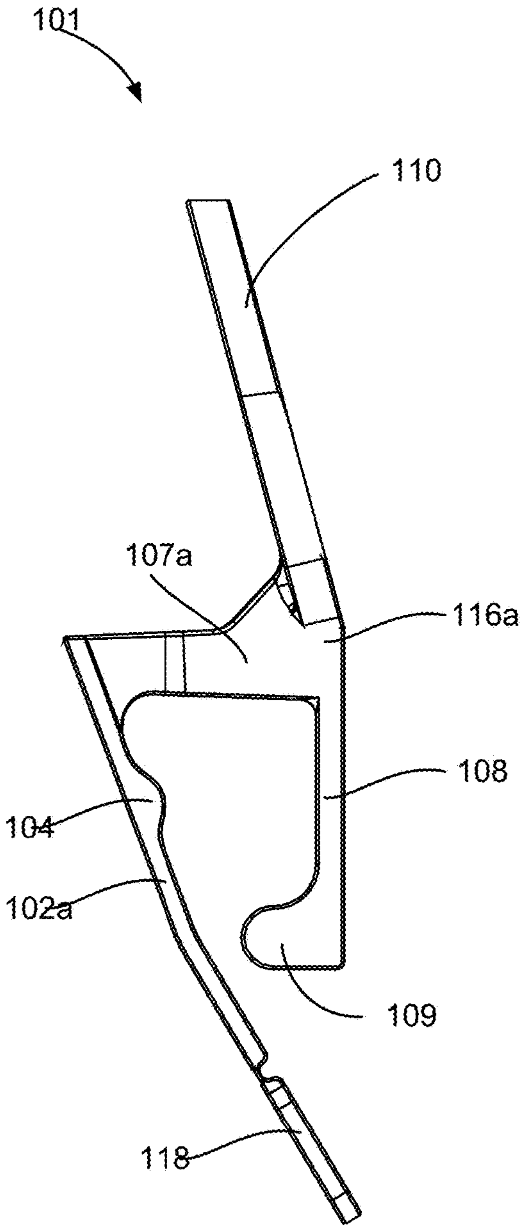
FIG. 13 is a side elevated view of the example gutter clip, according to an embodiment of the present application.
Figure 14:
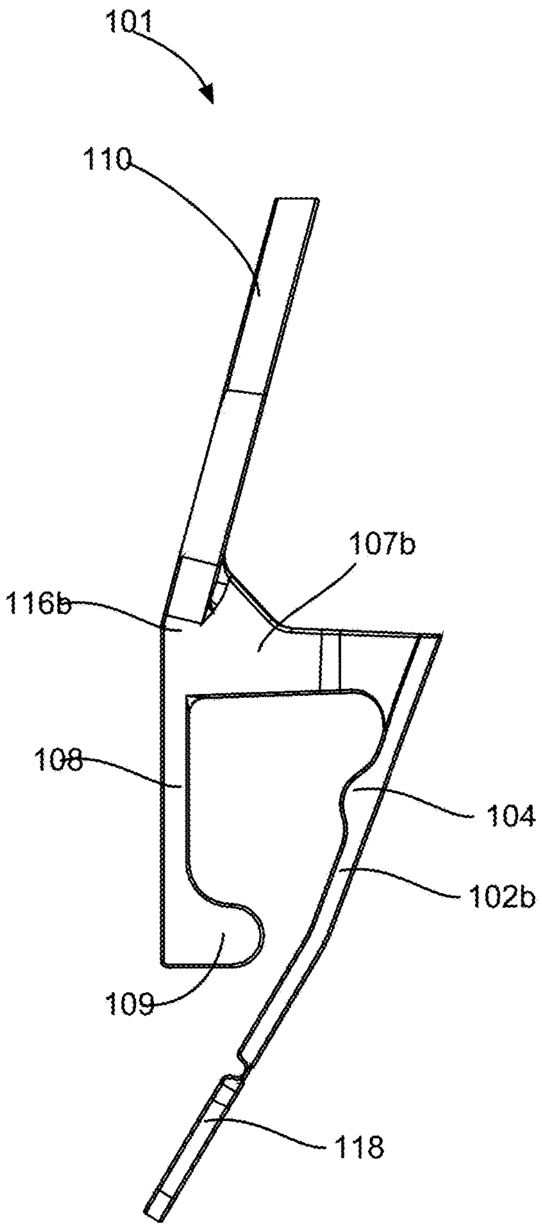
FIG. 14 is a side elevated view of the example gutter clip, according to an embodiment of the present application.
Figure 15:
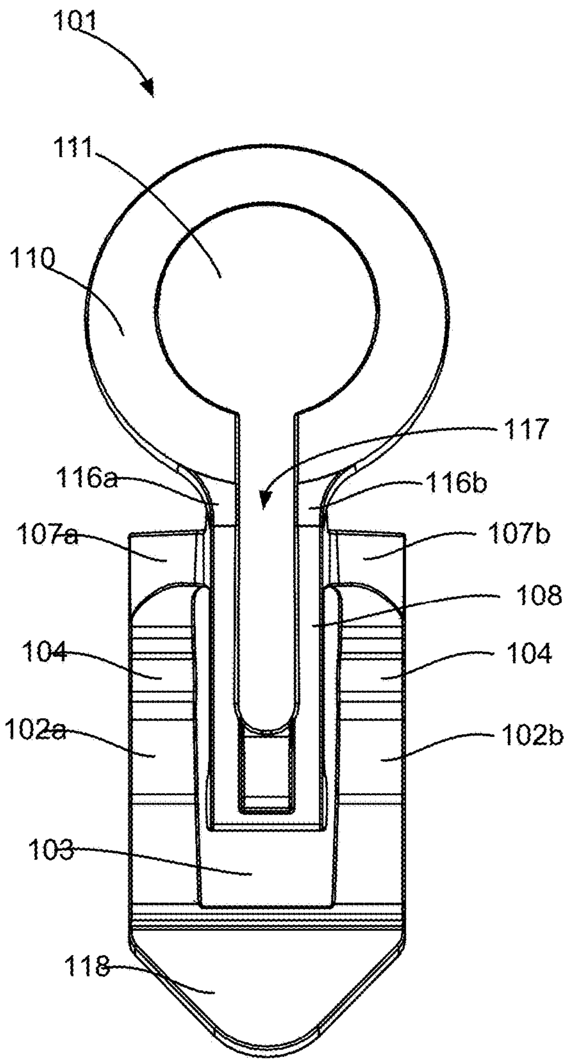
FIG. 15 is a front elevated view of the example gutter clip, according to an embodiment of the present application.
Figure 16:
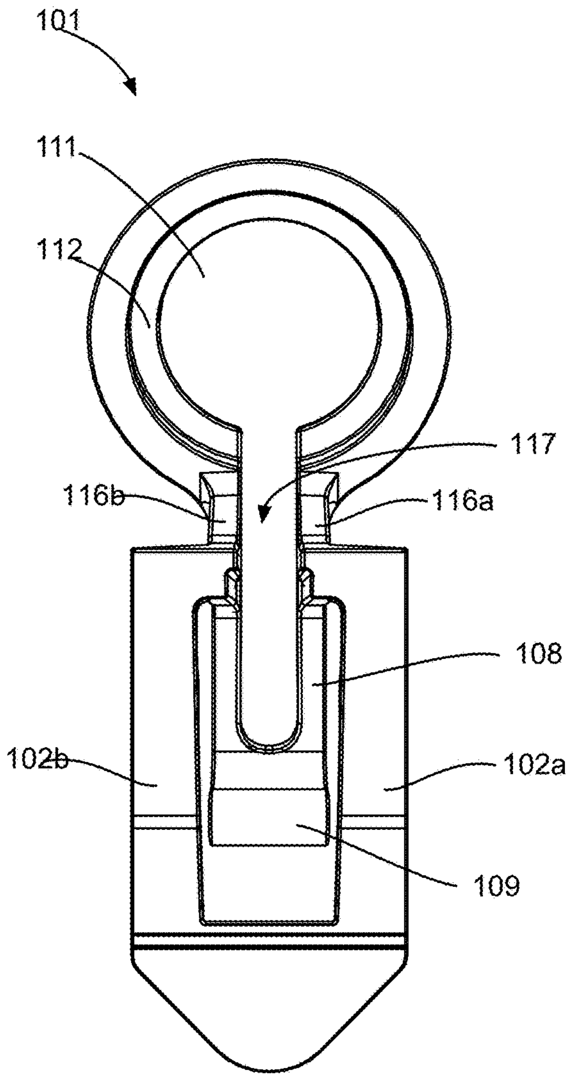
FIG. 16 is a rear elevated view of the example gutter clip, according to an embodiment of the present application.
Figure 17:
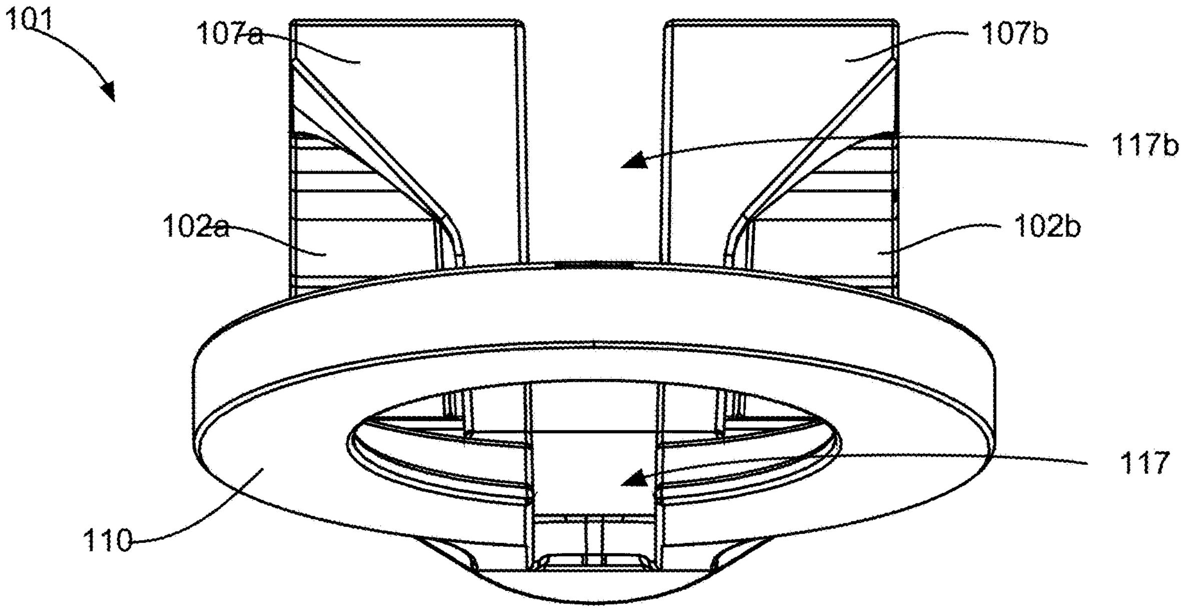
FIG. 17 is a top plan view of the example gutter clip, according to an embodiment of the present application.
Figure 18:
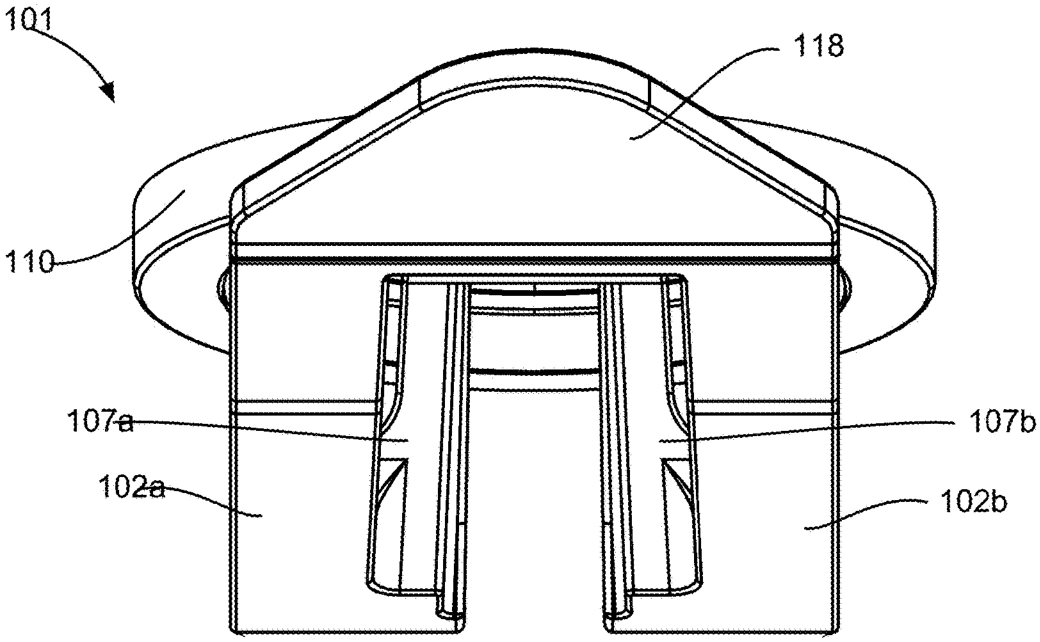
FIG. 18 is a bottom plan view of the example gutter clip, according to an embodiment of the present application.

Cables, wires, strands and alternate objects could rest on FIG. 3 and FIG. 4, bracket 5 and outer flange 10 to prevent it from falling.

The bulb holder section includes the outer flange 10 and a hole 11 which can vary in size based on the size of the bulb.

Referring to FIG. 1, the clip 1 may be formed from a synthetic resin and it is a one piece construction. The clip 1 is made from a resin which may be an acrylic, a polycarbonate, a nylon, a polyethylene or polypropylene or mixtures thereof. The resin material is made to withstand cold temperatures to eliminate breaking clips.

FIGS. 1-8 illustrate various views of a clip 1 according to an embodiment of the present application. The clip 1 includes an elongated body 2, a strut 7, a cantilever 8, and a bulb holder collectively formed from outer flange 10, hole 11, and socket guide ridge 12. The strut 7 extends between and rigidly couples the body 2 and the cantilever 8, such that the body 2, the strut, and the cantilever (which may be referred to referred to herein as a "gripping section" or "attachment section") form a substantially "U-shaped" or "C-shaped" structure.

In some implementations, such as the embodiment depicted in FIGS. 1-8, the angles between the body 2 and the strut, and between the strut and the cantilever 8 may be less than 180 degrees, such that the end of the cantilever 8 opposite to its point of attachment with the strut converges toward the body 2. In these implementations, the cantilever 8 may be movable with respect to the body 2 to accommodate the positioning of a gutter, shingle, or other structure in between the cantilever 8 and the body 2. When installed onto a gutter, shingle, or other structure, the cantilever 8 applies a force toward the body 2, which serves to hold the clip 1 firmly in place.

In some embodiments, the cantilever 8 includes a lobe 9 extending toward the body 2. Additionally, and/or alternatively, the body 2 may include one or more protrusions 4 extending toward the cantilever 8. The lobe 9 and/or the one or more protrusions 4 may increase the effective gripping force between the cantilever 8 and the body 2 when positioned about a structure. The shapes and sizes of the lobe 9 and the one or more protrusions 4 may vary, depending on a desired amount of gripping force, the particular structure about which the clip 1 is designed to attach, and/or various other factors.

The clip 1 also includes a substantially circular bulb holder, which is formed from an outer flange 10, a socket guide ridge 12, and a hole 11 having a resting diameter 19. The bulb holder is adapted to receive a bulb (e.g., a C7 or C9 bulb) oriented with its major axis (e.g., the axis extending from the front tip of the bulb through the electrical contacts at the rear end of the bulb) extending through the hole 11.

The clip 1 may further include neck 16. The neck 16 may be a portion of material that extends between the outer flange 10 and the socket guide ridge 12 of the bulb holder and the cantilever 8 and/or the strut 7. In addition, the clip 1 may include one more triangularly-shaped gussets or reinforcement structures at various locations along the clip (e.g., between the strut 7 and the neck sections 8, and/or between the strut sections 7 and the body 2), which may strengthen particular aspects of the clip 1.

Some optional aspects of the clip 1 are shown in FIGS. 1-10, which may be included or excluded depending on the particular implementation. An opening 15 may be included toward the end of the cantilever 8 near the lobe 9, which may reduce the amount of material used in constructing the clip 1, and/or may reduce the likelihood of the material clotting as it flows through a die tool. In some use cases, a hinge 18 may be included in clip 1, which may be foldable along the crease between the body 2 and the hinge 18. The hinge 18 may be used to assist in mounting the clip 1 to certain structures, such as shingles.

FIGS. 9-18 illustrate various views of a clip 101 according to an embodiment of the present application. The clip 101 includes an elongated body 102, a strut formed from strut sections 107*a* and 107*b*, a cantilever 108, and a bulb holder collectively formed from outer flange 110, hole 111, and socket guide ridge 112. The strut extends between and rigidly couples the body 102 and the cantilever 108, such that the body 102, the strut, and the cantilever (collectively referred to herein as a "gripping section" or "attachment section") form a substantially "U-shaped" or "C-shaped" structure.

In some implementations, such as the embodiment depicted in FIGS. 9-18, the angles between the body 102 and the strut, and between the strut and the cantilever 108 may be less than 180 degrees, such that the end of the cantilever 108 opposite to its point of attachment with the strut converges toward the body 102. In these implementations, the cantilever 108 may be movable with respect to the body 102 to accommodate the positioning of a gutter, shingle, or other structure in between the cantilever 108 and the body 102. When installed onto a gutter, shingle, or other structure, the cantilever 108 applies a force toward the body 102, which serves to hold the clip 101 firmly in place.

In some embodiments, the cantilever 108 includes a lobe 109 extending toward the body 102. Additionally, and/or alternatively, the body 102 may include one or more protrusions 104 extending toward the cantilever 108. The lobe 109 and/or the one or more protrusions 104 may increase the effective gripping force between the cantilever 108 and the body 102 when positioned about a structure. The shapes and sizes of the lobe 109 and the one or more protrusions 104 may vary, depending on a desired amount of gripping force, the particular structure about which the clip 101 is designed to attach, and/or various other factors.

The clip 101 also includes a substantially circular bulb holder, which is formed from an outer flange 110, a socket guide ridge 112, and a hole 111 having a resting diameter 119. The bulb holder is adapted to receive a bulb (e.g., a C7 or C9 bulb) oriented with its major axis (e.g., the axis extending from the front tip of the bulb through the electrical contacts at the rear end of the bulb) extending through the hole 111.

The clip 101 further includes a slot 117 extending from the hole 111 and through portions of the cantilever 108, strut, and body 102. For example, a portion 117*a* of the slot 117 may extend through at least some of the length of the cantilever 108. In addition, a portion 117*b* of the slot 117 may extend across some or all of the strut, dividing the strut into strut sections 107*a* and 107*b*. Furthermore, a portion 103 of the slot 117 may effectively extend through a portion of the body 102, forming body sections 102*a* and 102*b*.

The slot 117 (including portion 117*a*, portion 117*b*, and/or portion 103), which may bisect a portion of the clip 101, enables the hole 111 to expand beyond its resting diameter 119. Example illustrations of this expansion process is shown and described in more detail with respect to FIGS. 19A-19C. As an object with a larger diameter than the resting diameter 119 of the hole 111 is pressed against the socket guide ridge 112 of the bulb holder, the opposing portions of the clip 101 (e.g., a first portion formed from part of cantilever 108, strut section 107*a*, and body section 102*a*, and a second portion formed from part of cantilever 108, strut section 107*b* and body section 102*b*) are able to move apart from each other, which in turn causes the hole 111 to expand in diameter. In this manner, a bulb or other object may pass through the hole 111 of the bulb holder, without having to remove the bulb from its socket or otherwise perform any disassembly steps.

Although the slot 117 is shown in FIGS. 9-18 as having a particular size and shape, it will be appreciated that the particular dimensions and design of slot 117 may vary among different implementations. For example, different materials, such as plastics or synthetic resins, may exhibit different levels of flexibility (e.g., the ability to temporarily deform when subjected to a force and return to an original form-factor when no forces are applied to the material). It will be appreciated that the size, shape, and extent of the slot 117 may vary based on the material used to construct the clip 101. For instance, the size and extent to which the slot 117 extends through the clip 101 may be diminished relative to the dimensions shown in FIGS. 9-18 for clips constructed from plastics that exhibit high levels of flexibility.

The embodiments according to the present disclosure may be described as including a bisected "gripping structure" that is separated into two gripping structure sections. For instance, the "left" side of the clip 101 may include the left side of the cantilever 108, the strut section 107*a*, and the body section 102*a*. Likewise, the "right" side of the clip 101 may include a right side of the cantilever 108, the strut section 107*b*, and the body section 102*b*. The opposing "left" and "right" gripping structure sections may be rigidly coupled to each other at one or more locations of the clip 101, such as near the bottom of the body 102 and/or near the tip of the cantilever 108. The left and right gripping structure sections may be pulled apart from each other to some degree, which in turn causes the hole 111 of the bulb holder to expand in diameter.

The clip 101 may further include a neck formed from neck sections 116*a* and 116*b*, which are separated by slot 117. The neck may be a portion of material that extends between the outer flange 110 and the socket guide ridge 112 of the bulb holder and the cantilever 108 and/or the strut sections 107*a* and 107*b*. In addition, the clip 101 may include one more triangularly-shaped gussets or reinforcement structures at various locations along the clip (e.g., between the strut sections 107*a* and 107*b* and the neck sections 116*a* and 116*b*, respectively, and/or between the strut sections 107*a* and 107*b* and the body portions 102*a* and 102*b*, respectively), which may strengthen particular aspects of the clip 101.

Some optional aspects of the clip 101 are shown in FIGS. 9-18, which may be included or excluded depending on the particular implementation. An opening 115 may be included toward the end of the cantilever 108 near the lobe 109, which may reduce the amount of material used in constructing the clip 101, and/or may reduce the likelihood of the material clotting as it flows through a die tool. In some use cases, a hinge 118 may be included in clip 101, which may be foldable along the crease between the body 102 and the hinge 118. The hinge 118 may be used to assist in mounting the clip 101 to certain structures, such as shingles.

Figure 19A:
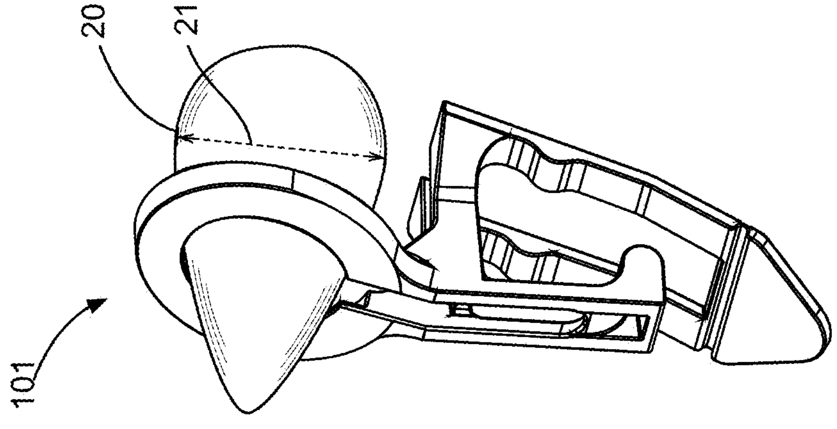
FIGS. 19A, 19B, and 19C illustrate an example installation process for a bulb relative to the example gutter clip, according to an embodiment of the present application.
Figure 19B:
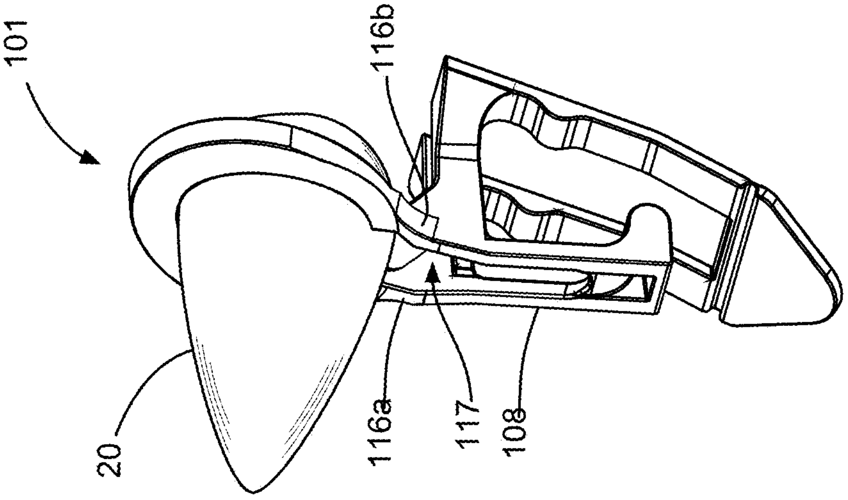
Figure 19C:
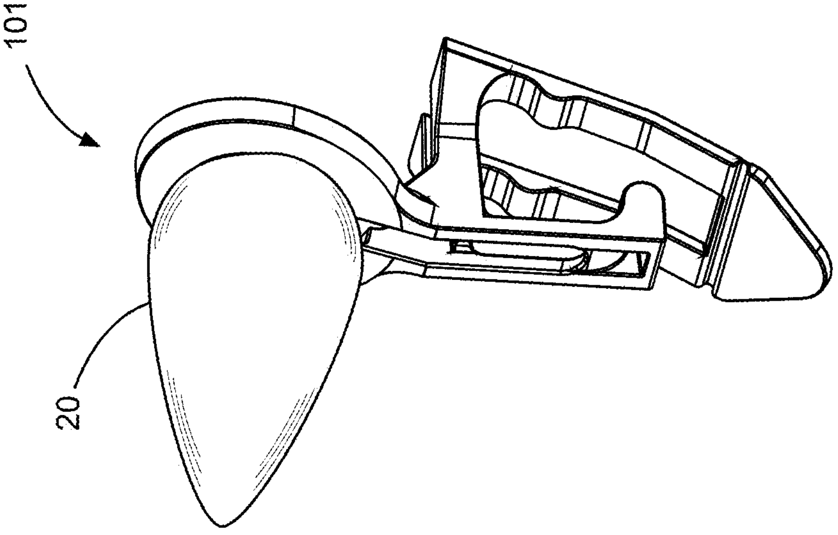

FIGS. 19A-19C depict an example installation process for the clip 101, according to an example embodiment of the present application. As described above, the hole 111 of the clip 101 has a resting diameter 119. In the example illustrated in FIGS. 19A-19C, a bulb 20 has a maximum diameter 21 that is larger than the resting diameter 119. For typical clips, the bulb 20 would not be able to pass through the bulb holder. However, the clips according to the present disclosure are designed to deform, expand, or otherwise flex to accommodate passage of the bulb 20, despite its maximum diameter 21 being larger than the resting diameter 119 of the hole 111 of the bulb holder of clip 101.

In FIG. 19A, the clip 101 is pressed against bulb 20, such that the front end of the bulb 20 passes through the hole 111 from the rear side of the bulb holder toward the front end of the bulb holder. At the stage shown in FIG. 19A, the bulb 20 has partially passed through the hole 111, up until the diameter of the bulb 20 is approximately the same as the resting diameter 119 of the hole 111. With a typical clip, the bulb 20 might not be able to extend much farther through the bulb hole.

Between FIGS. 19A and 19B, the clip 101 is pressed against the bulb 20. The gradual increase in diameter of the bulb 20 may cause the bulb holder to expand, and may also cause the opposing sections of the cantilever 108, the strut sections 107*a* and 107*b*, and the body sections 102*a* and 102*b* to flex away from each other. In this manner, the diameter of the bulb holder expands to at least the maximum diameter 21 of the bulb 20, thereby enabling passage of the bulb 20 through the bulb holder, as shown in FIG. 19B.

After the maximum diameter 21 portion of the bulb 20 has passed through the bulb holder, the diameter of the bulb 20 more rapidly decreases (due to the asymmetric ovoid shape of the bulb), allowing the clip 101 to return to its resting position, as shown in FIG. 19C. As shown in FIGS. 19A-19C, the clip designs of the present disclosure can be installed without the tedious and time-consuming steps of disengaging and re-engaging the bulbs from their electrical contacts or sockets.

Figure 20:
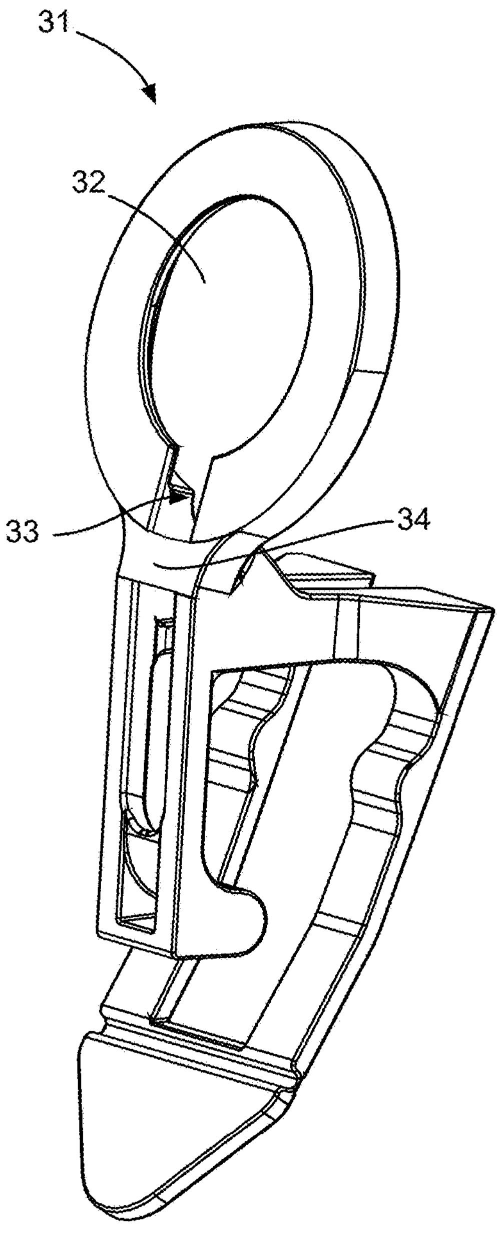
FIG. 20 is a front perspective view of an alternative example gutter clip, according to an embodiment of the present application.
Figure 21:
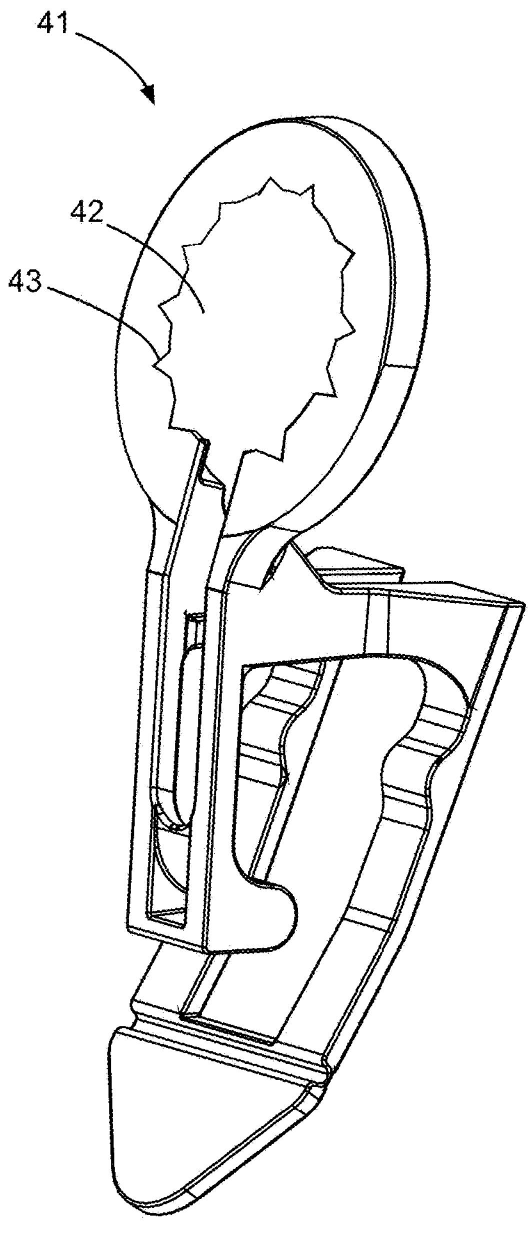
FIG. 21 is a front perspective view of an alternative example gutter clip, according to an embodiment of the present application.

FIGS. 20 and 21 depict example alternative embodiments of the present disclosure. Referring now to FIG. 20, a clip 31 includes a cutout 33 that is similar to the slot 17 in FIGS. 9-18. In this example, however, the cutout 33 terminates at the neck 34, and does not continuously extend through to the cantilever, strut, or body portions of the clip 31. Depending on the particular implementation, the cutout 33 may enable a satisfactory amount of expansion to bulb hole 32, without extending through the other sections of the clip 31.

Referring now to FIG. 21, a clip 41 includes one or more cutouts 43 around the outer perimeter of hole 42. In this example, multiple triangular cutouts 43 may be formed about the hole 42, effectively forming an inner diameter (defined by the inner diameter of the hole 42) and an outer diameter (defined by the tips of the cutouts 43). Similar in function to the example described above with respect to FIGS. 9-18, the embodiment according to FIG. 21 may allow for passage of bulbs having a maximum diameter that is larger than the inner diameter of the hole 42, as portions of material around the perimeter of hole 42 may be temporarily deformed or flexed when subjected to a force.

Although FIGS. 20 and 21 depict particular alternative embodiments, it will be appreciated that a variety of alternative designs may be implemented based on the teachings of the present disclosure. One or more aspects of a clip, such as the dimensions of its components, the dimensions of its cutouts or holes, the material used to construct the clip, and/or other aspects may lead to different designs not explicitly shown and described herein. The specific examples shown and described herein are not intended to limit the scope of the present application in any way.

As described herein, a "slot" or "cutout" may generally refer to a feature, combination of features, or space that extends along one or more elements of a clip and enables the bulb holder to expand beyond its resting diameter. Neither term is intended to limit the shape or size of the feature, combination of features, or spaces.

The clips according to the present disclosure may be formed from a synthetic resin, and may be integrally formed as a one-piece construction. The clips may be made from a resin which may be an acrylic, a polycarbonate, a nylon, a polyethylene or polypropylene or mixtures thereof. The resin material used to construct the clips of the present disclosure may be able to withstand cold temperatures to reduce the chance that the clips breaks.

Regardless of the specific material used to construct the clips of the present disclosure, the material may be "resilient," flexible, or exhibit elastic qualities. As described herein, a "resilient material" may refer to a material that is able to be deformed, at least to some extent, when subjected to a force, and returns to an original form factor when not subjected to an external force. A structure formed from a resilient material may have a "memory" of its resting or relaxed state, in that the structure may resist deformation, bending, or stretching with a tendency to return to its relaxed state. In addition, aspects of a clip described as "rigidly coupled" herein may refer to a rigid connection between structural elements formed from a resilient material, such that the rigid connection permits some amount of flexibility and/or deformation.

Although certain example methods and apparatus have been described herein, the scope of coverage of this patent is not limited thereto. On the contrary, this patent covers all methods, apparatuses, and articles of manufacture fairly falling within the scope of the appended claims, either literally or under the doctrine of equivalents. Accordingly, this patent specification is intended to embrace all alternatives, modifications and variations of the present invention that have been discussed herein, and other embodiments that fall within the spirit and scope of the above described invention.

It should be understood that arrangements described herein are for purposes of example only. As such, those skilled in the art will appreciate that other arrangements and other elements (e.g. machines, interfaces, operations, orders, and groupings of operations, etc.) can be used instead, and that some elements may be omitted altogether, according to the desired results. Further, many of the elements that are described are functional entities that may be implemented as discrete or distributed components or in conjunction with other components, in any suitable combination and location, or as other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A clip for holding a light bulb for display on a gutter, shingle, or other structure, the clip comprising:

an elongated base having a first end and a second end;

a support arm having a first end and a second end spaced away from the first end of the support arm, the first end of the support arm being connected to the second end of the base;

a cantilever beam having a first end and a second end, the first end of the cantilever beam being connected to the support arm, the cantilever beam extending away from the support arm in a first direction to the second end of the cantilever beam, the second end of the cantilever beam being disposed over the base, the second end of the cantilever beam and the base cooperatively defining a gap therebetween that enables receiving an object thickness into the gap, the cantilever beam being elastically deformable to accommodate objects of different thicknesses being received into the gap; and a bulb holder being attached to the support arm, the bulb holder defining a through-hole being configured to receive and hold a portion of a light bulb in the bulb holder, the bulb holder being attached to the support arm between the first end of the cantilever beam and the second end of the base wherein the bulb holder is attached to the support arm at an intermediate portion of the support arm spaced from both the first and second ends of the support arm, the support arm and the bulb holder sharing a common portion where the bulb holder is attached to the support arm, and wherein the bulb holder comprises a generally circular wall surrounding the through-hole of the bulb holder and the bulb holder further comprises a plurality of tabs circumferentially spaced along the wall and extending radially from the wall into the through-hole;

the bulb holder comprising a pair of arcuate outer wall portions extending from respective opposite sides of the common portion of the bulb holder and the support arm; and the bulb holder extending away from the support arm in a second direction substantially opposite to the first direction.

2. The clip of claim 1 wherein the bulb holder through-hole extends along an axis from a first side of the bulb holder to an opposite second side of the bulb holder, the tabs being flush with one of the sides of the bulb holder.

3. The clip of claim 1 formed as a one-piece injection-molded member.

4. The clip of claim 3 formed from a resin, synthetic resin, a resin material, or mixture of resins.

5. The clip of claim 1 wherein the support arm extends along a first axis from the first end to the second end of the support arm, and the bulb holder through-hole extends along a second axis that is substantially parallel to the first axis.

6. The clip of claim 1 comprising at least one gusset attached to the bulb holder and to the support arm.

7. The clip of claim 1 comprising at least one gusset attached to the base and to the support arm.

8. The clip of claim 1 wherein there is no neck connecting the bulb holder to the support arm.

9. The clip of claim 1 wherein the cantilever beam extends along an axis, the bulb holder not disposed on the axis.

10. A clip for holding a light bulb for display on a gutter, shingle, or other structure, the clip comprising:

an elongated base having a first end and a second end;

a support arm having a first end and a second end spaced away from the first end of the support arm, the first end of the support arm being connected to the second end of the base;

a cantilever beam having a first end and a second end, the first end of the cantilever beam being connected to the support arm, the cantilever beam extending away from the support arm in a first direction to the second end of the cantilever beam, the second end of the cantilever beam being disposed over the base, the second end of the cantilever beam and the base cooperatively defining a gap therebetween that enables receiving an object thickness into the gap, the cantilever beam being elastically deformable to accommodate objects of different thicknesses being received into the gap; and a bulb holder being attached to the support arm, the bulb holder defining a through-hole being configured to receive and hold a portion of a light bulb in the bulb holder, wherein the bulb holder comprises a generally circular wall surrounding the through-hole of the bulb holder and the bulb holder further comprises a plurality of tabs circumferentially spaced along the wall and extending radially from the wall into the through-hole;

the bulb holder comprising a pair of arcuate outer wall portions extending from respective opposite sides of the support arm; and the bulb holder extending away from the support arm in a second direction substantially opposite to the first direction.

11. The clip of claim 10 wherein the bulb holder through-hole extends along an axis from a first side of the bulb holder to an opposite second side of the bulb holder, the tabs being flush with one of the sides of the bulb holder.

12. The clip of claim 10 formed as a one-piece injection-molded member.

13. The clip of claim 12 formed from a resin, synthetic resin, a resin material, or mixture of resins.

14. The clip of claim 10 wherein the support arm extends along a first axis from the first end to the second end of the support arm, and the bulb holder through-hole extends along a second axis that is substantially parallel to the first axis.

15. The clip of claim 10 comprising at least one gusset attached to the bulb holder and to the support arm.

16. The clip of claim 10 comprising at least one gusset attached to the base and to the support arm.

17. The clip of claim 10 wherein there is no neck connecting the bulb holder to the support arm.

18. The clip of claim 10 wherein the cantilever beam extends along an axis, the bulb holder not disposed on the axis.

19. The clip of claim 10 wherein the bulb holder is attached to the support arm between the first end of the cantilever beam and the second end of the base.

20. The clip of claim 10 wherein the bulb holder is attached to the support arm at an intermediate portion of the support arm spaced from both the first and second ends of the support arm.

21. A clip for holding a light bulb for display on a gutter, shingle, or other structure, the clip comprising:

an elongated body having a first end and a second end;

a bracket or strut having a first end and a second end spaced away from the first end of the bracket or strut, the first end of the bracket or strut being connected to the second end of the elongated body;

a cantilever having a first end and a second end, the first end of the cantilever being connected to the bracket or strut, the cantilever extending away from the bracket or strut in a first direction to the second end of the cantilever, the second end of the cantilever being disposed over the elongated body, the second end of the cantilever and the elongated body cooperatively defining a distance therebetween that enables receiving an object thickness into the distance, the clip configured to elastically deform to accommodate a gutter, eave, or structure being received into the distance; and a bulb holder being attached to the bracket or strut, the bulb holder defining a hole being configured to receive and hold a portion of a bulb in the bulb holder, wherein the bulb holder comprises a generally circular wall surrounding the hole of the bulb holder and the bulb holder further comprises a plurality of tabs circumferentially spaced along the wall and extending radially from the generally circular wall into the hole;

the bulb holder comprising a pair of arcuate outer wall portions extending from respective opposite sides of the bracket or strut; and the bulb holder extending away from the bracket or strut in a second direction substantially opposite to the first direction.

22. The clip of claim 21 wherein the hole extends along an axis from a first side of the bulb holder to an opposite second side of the bulb holder, the tabs being flush with one of the sides of the bulb holder.

23. The clip of claim 21 wherein the bulb holder is attached to the bracket or strut between the first end of the cantilever and the second end of the elongated body.

24. The clip of claim 21 wherein the bulb holder is attached to the bracket or strut at an intermediate portion of the bracket or strut spaced from both the first and second ends of the bracket or strut.

25. A clip for holding a light bulb for display on a gutter, shingle, or other structure, the clip comprising:

an elongated base having a first end and a second end;

a support arm having a first end and a second end spaced away from the first end of the support arm, the first end of the support arm being connected to the second end of the base;

a cantilever beam having a first end and a second end, the first end of the cantilever beam being connected to the support arm, the cantilever beam extending away from the support arm in a first direction to the second end of the cantilever beam, the second end of the cantilever beam being disposed over the base, the second end of the cantilever beam and the base cooperatively defining a gap therebetween that enables receiving an object thickness into the gap, the cantilever beam being elastically deformable to accommodate objects of different thicknesses being received into the gap; and a bulb holder being attached to the support arm, the bulb holder defining a through-hole being configured to receive and hold a portion of a light bulb in the bulb holder, wherein the bulb holder comprises a generally circular wall surrounding the through-hole of the bulb holder and the bulb holder further comprises a plurality of tabs circumferentially spaced along the wall and extending radially from the wall into the through-hole; and the bulb holder extending away from the support arm in a second direction substantially opposite to the first direction.

26. The clip of claim 25, wherein the bulb holder through-hole extends along an axis from a first side of the bulb holder to an opposite second side of the bulb holder, the tabs being flush with one of the sides of the bulb holder.

* * * * *